April 1, 1941. E. B. NOLT 2,236,628
MEANS FOR BALING MATERIAL
Filed April 9, 1938 6 Sheets-Sheet 1
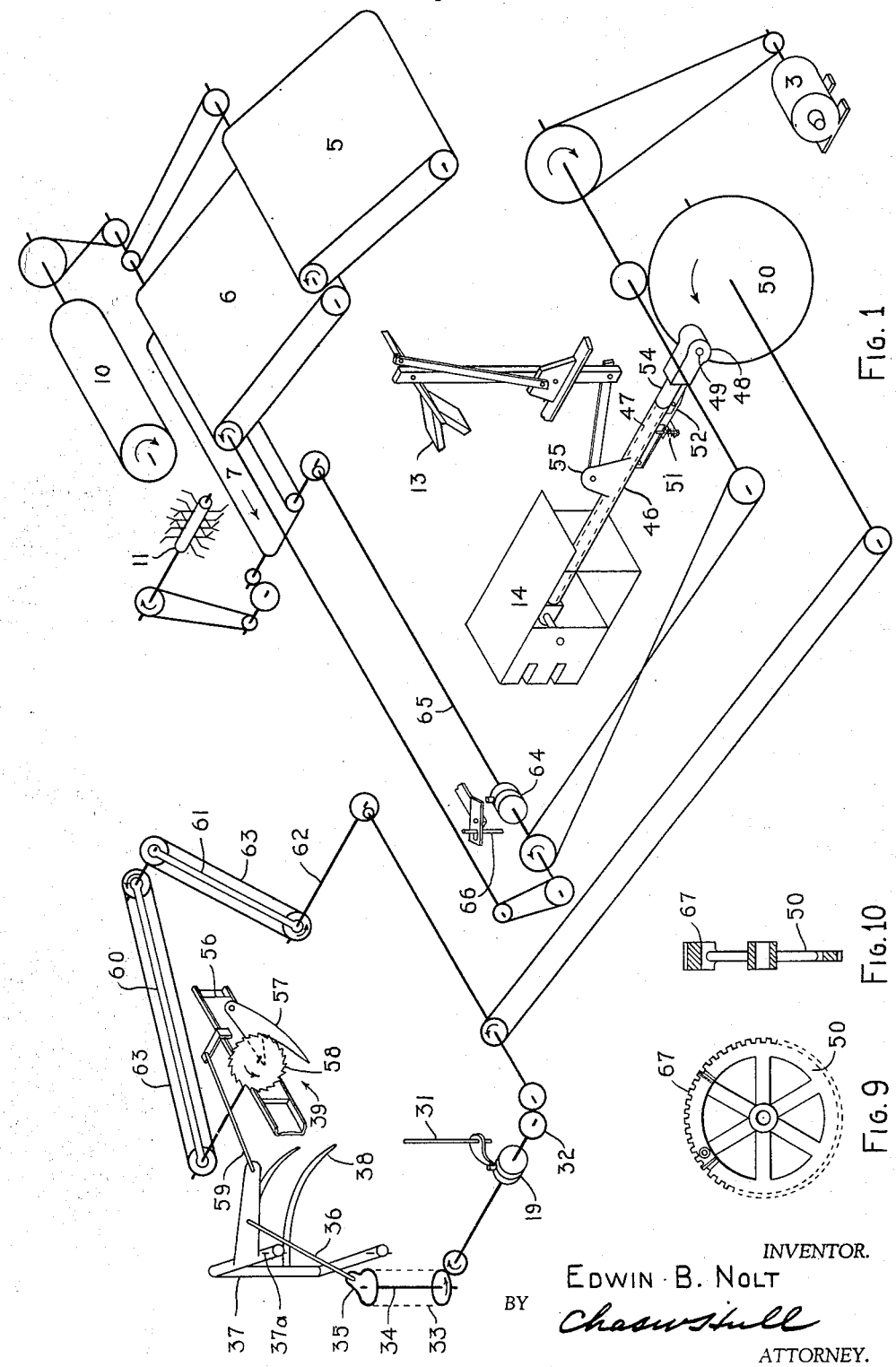
INVENTOR.
EDWIN B. NOLT
BY Chas W Hull
ATTORNEY.

April 1, 1941.  E. B. NOLT  2,236,628
MEANS FOR BALING MATERIAL
Filed April 9, 1938  6 Sheets-Sheet 2
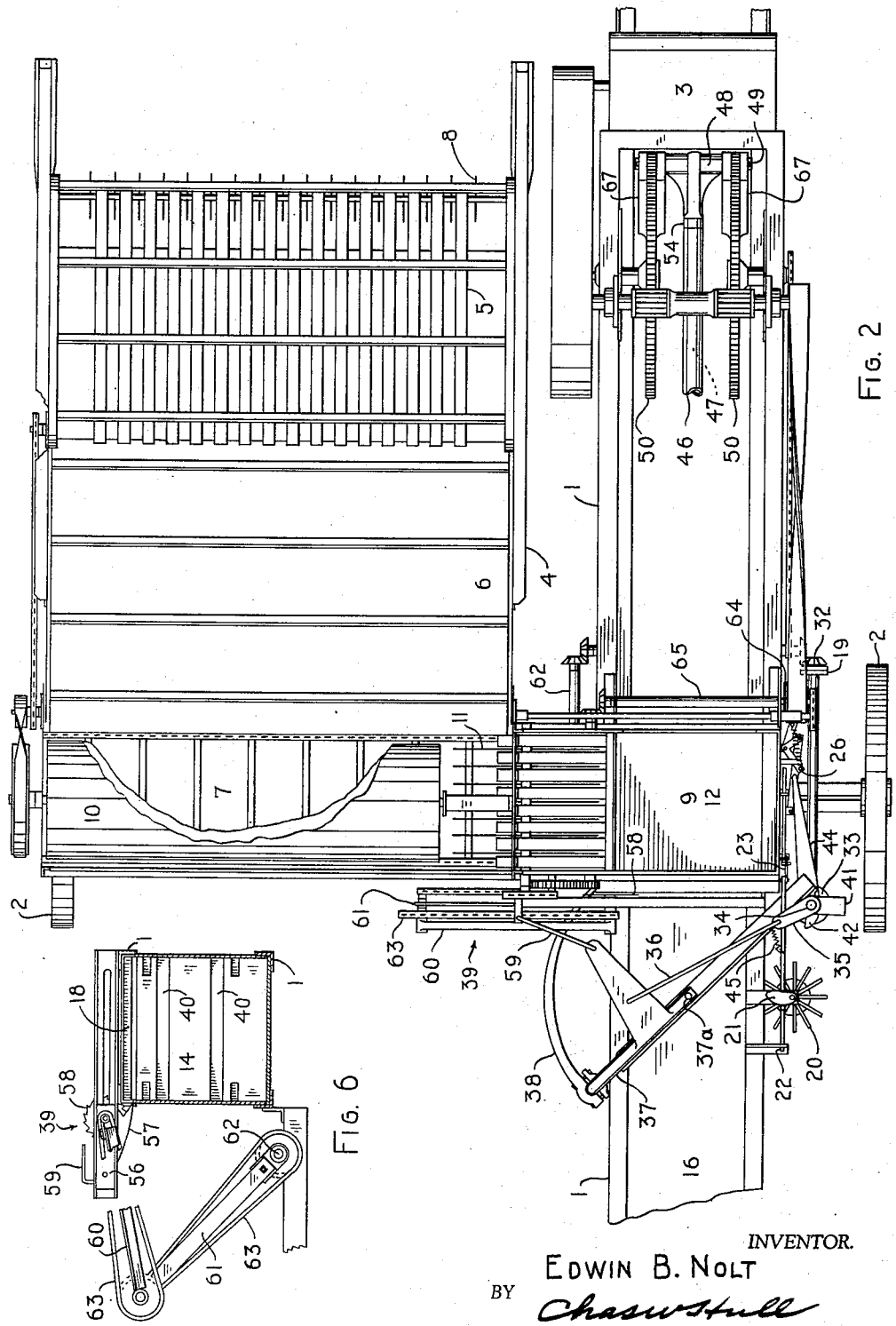
INVENTOR.
EDWIN B. NOLT
BY Chas W Stull
ATTORNEY.

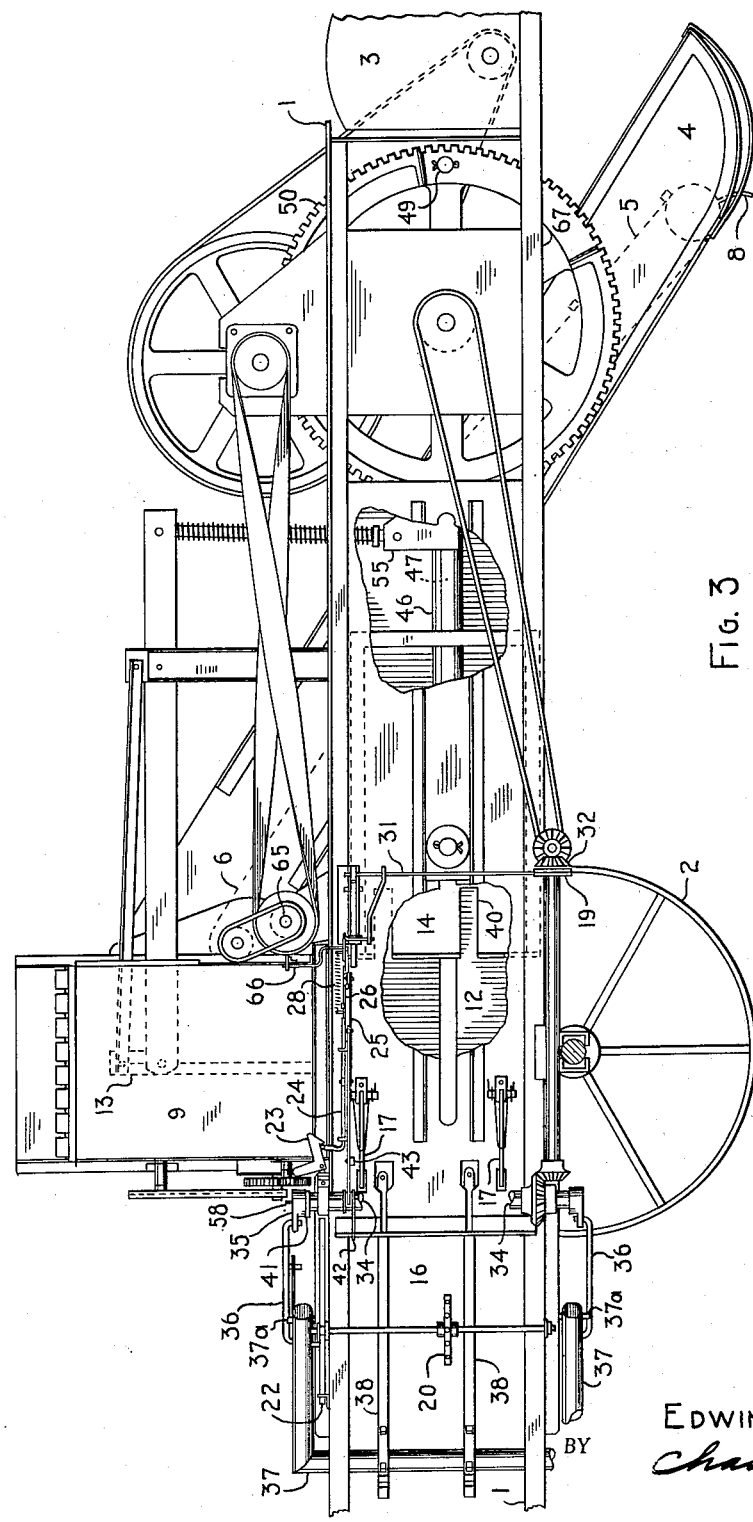

April 1, 1941.    E. B. NOLT    2,236,628
MEANS FOR BALING MATERIAL
Filed April 9, 1938    6 Sheets-Sheet 4
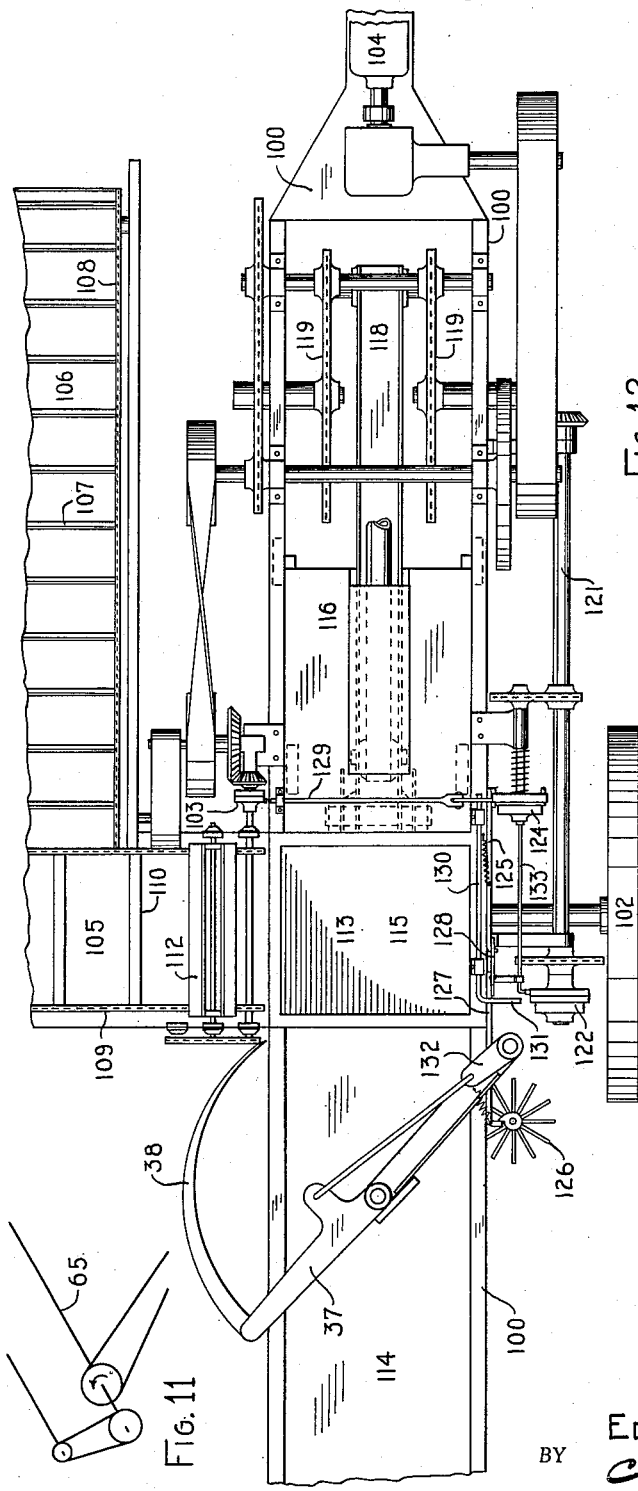
INVENTOR.
EDWIN B. NOLT
BY
ATTORNEY.

April 1, 1941.  E. B. NOLT  2,236,628
MEANS FOR BALING MATERIAL
Filed April 9, 1938  6 Sheets-Sheet 6

INVENTOR.
EDWIN B. NOLT
BY
ATTORNEY.

Patented Apr. 1, 1941

2,236,628

UNITED STATES PATENT OFFICE 2,236,628

MEANS FOR BALING MATERIAL

Edwin B. Nolt, Farmersville, Pa.

Application April 9, 1938, Serial No. 201,089

13 Claims. (Cl. 100—20)

The present improvements relate to the baling of loose material, and more particularly to means and methods for baling loose fibrous material, such as hay, straw, plant stalks, alfalfa and the like. While the devices may be used as stationary baling machines, they are particularly adapted for transit in the field for the gathering up and baling of loose material and discharging of closely packed or solid bales.

The numerous objects of the invention include the provision of a device which is completely automatic and requires no human attention during operation. The provision of an automatic baling machine, wherein the bales are bound by hand, constitutes a further object. The provision of a baler for use with a combine constitutes another object.

Another object of the improvements is to provide a baling device of the reciprocating plunger type wherein the accumulation of the material is suspended while the bale is being bound. To accomplish this, various modifications are illustrated, wherein either the plunger or the feed means is temporarily arrested. A further object is to provide a device wherein a tightly packed and automatically bound bale is produced.

The present improvements have been devised with a view to simplicity, lightness in weight, facility in handling, and speed in baling.

The provision of means for stopping the movement of the plunger or for temporarily arresting the plunger, whereby its forward face holds the accumulated material, thus dispensing with the conventional board, while the bale is bound or tied, with or without permitting the feed mechanism to continue, constitutes further objects.

The objects also include the provision of a beater wheel, improved driving gears for the plunger, a novel plunger and connecting rod construction, an improved actuating device incepted by the metering wheel, an improved pick-up and feed mechanism, a novel shearing device for the bales, as well as an improved construction for lapping and shearing the material.

Improved methods in baling loose material constitute a further object of the invention.

Other objects and advantages may occur to those skilled in the art, and will be apparent from the following description and from the drawings, in which certain well known mechanical expedients are shown in outline and not in detail.

Fig. 1 is a diagrammatic outline showing the transmission of power to the various operating parts of the several embodiments in Figs. 2 to 11. For convenience in illustration, certain parts are omitted, certain others are shown in perspective.

Fig. 2 is a plan view of one embodiment of the invention, with the plunger and certain parts omitted for convenience in illustration, or broken away.

Fig. 3 is a side elevation of the embodiment shown in Figs. 1 and 2, with parts of the feed arm omitted, other parts being broken away.

Fig. 4 is a diagrammatic exaggerated view of the lapped material and related elements.

Fig. 5 is a side elevation of the plunger and connecting rod.

Fig. 5a is an end view of the plunger of Fig. 5.

Fig. 6 is a detail of the shearing and actuating mechanism, in relation to the plunger, etc.

Fig. 7 is a plan view of the mechanism for incepting the operation of the plunger latch, clutches, tying and shearing mechanisms, with the parts in position before actuated by the metering wheel.

Figs. 9 and 10 are details of the gears for driving the plunger.

Fig. 11 is a fragmentary view of a modified form, all parts not shown being the same as shown in Figs. 1 to 10.

Fig. 12 is a plan view of a modified form, wherein the plunger is not arrested. Certain parts are omitted for convenience in illustration.

Figures 8, 13:
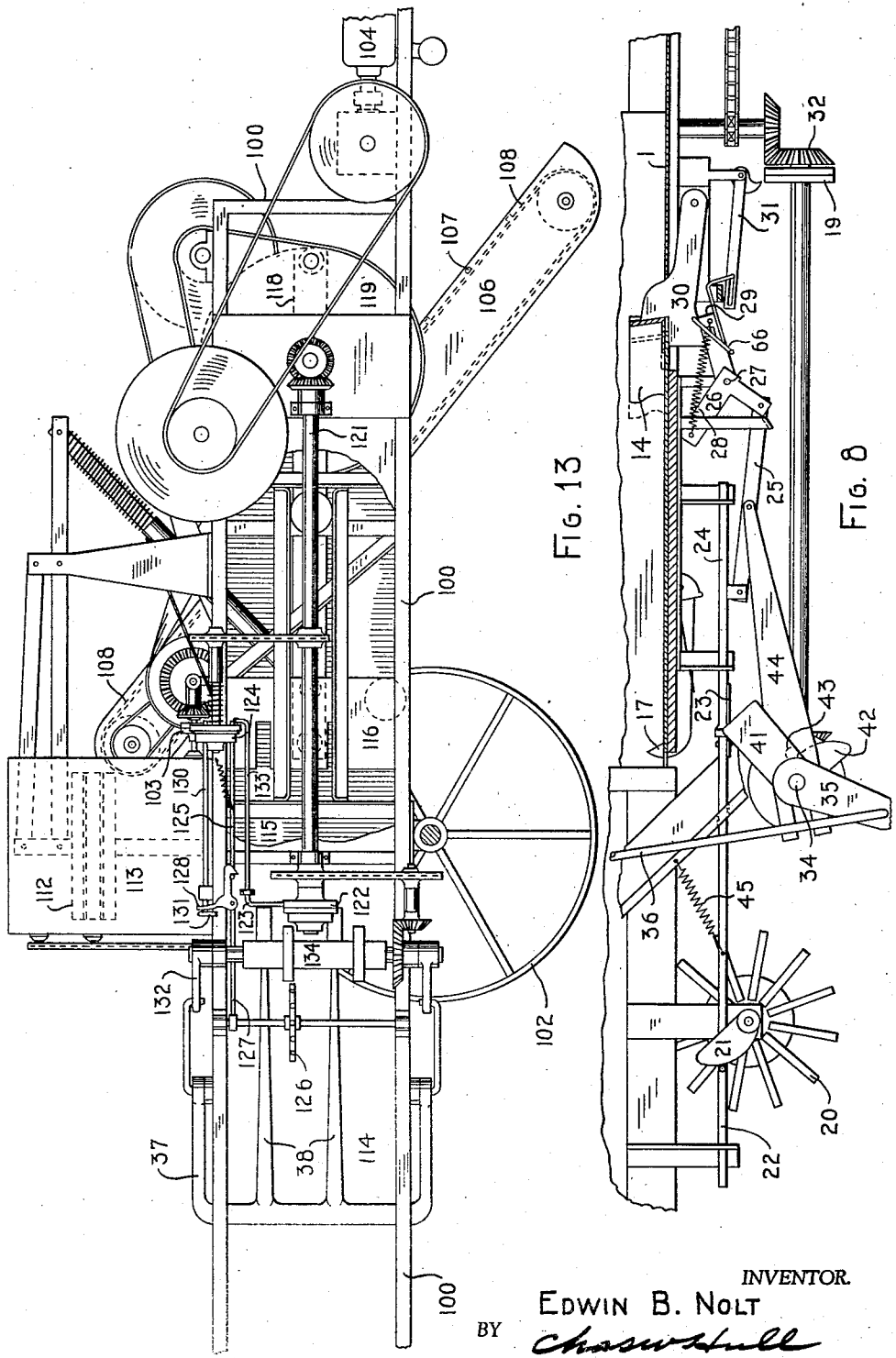
Fig. 8 is a view similar to Fig. 7, showing the parts in position after actuation by the metering wheel.
Fig. 13 is a side elevation of the embodiment shown in Fig. 12, certain parts being omitted for convenience in illustration.

Details of the tying mechanism, clutches, etc., are well known in the art, and are, therefore, not specifically described or illustrated.

The embodiment of the invention shown in Figs. 1 to 3 of the drawings is in the form of a light weight vehicle which is provided with means for collecting from the ground the material to be baled such as straw, hay, alfalfa, and the like. It consists of a frame 1 mounted on wheels or tires 2. The frame may carry a coupling (not shown) for removably attaching it to a tractor or other motive device. The frame 1 may also carry a motor 3 to provide power for actuating the baler mechanism. Obviously, however, the motor 3 may be dispensed with and the power obtained from some other source such as a suitable power take-off from the tractor. As is customary in this form of mechanism, the frame also carries a pick-up device 4, consisting of two inclined belt conveyors 5 and 6. As more clearly illustrated in the diagrammatic arrangement set forth in Fig. 1, these conveyors 5 and 6 are so positioned that their contiguous ends over-lap, the uppermost end of conveyor 5 being slightly above the end of conveyor 6, with a very minute clearance between them. This arrangement insures an effective transfer of the material collected from the field from the conveyor 5 to the conveyor 6, without loss of material or leaves which are recognized as very valuable.

As further illustrated in Fig. 1, the uppermost end of inclined conveyor 6 over-laps feed belt conveyor 7, there being a very minute clearance between the same. Referring again to the conveyor 5, it is of conventional construction, and the rotating rake 8 picks up the material from the field unto the traveling conveyor 5 which, as illustrated, is made of lath. In prior constructions, this lath type conveyor extended completely up the incline to the transverse belt conveyor 7 with the result that in the process, the valuable leaves of clover, alfalfa, etc. have become dislodged from the stalks, lost through the lath and lost at the time when the material passes off the upper end of the conveyor and drops onto the belt conveyor 7. The loss of both stalks and leaves at this juncture has, in the past, been very substantial and, by the improved arrangement just described, this loss is eliminated due to the fact that a plurality of inclined conveyors is employed, the lowermost of which requires the material to rest upon lath for a minimum time. Moreover, the conveyor 6 is preferably an endless canvas belt. This type of conveyor not only prevents loss of material but it discharges cleanly unto the transverse feed belt conveyor 7. This construction has the added advantage that the possibility of the material accumulating in the clearance between conveyors 6 and 7 is prevented.

Figure 14:
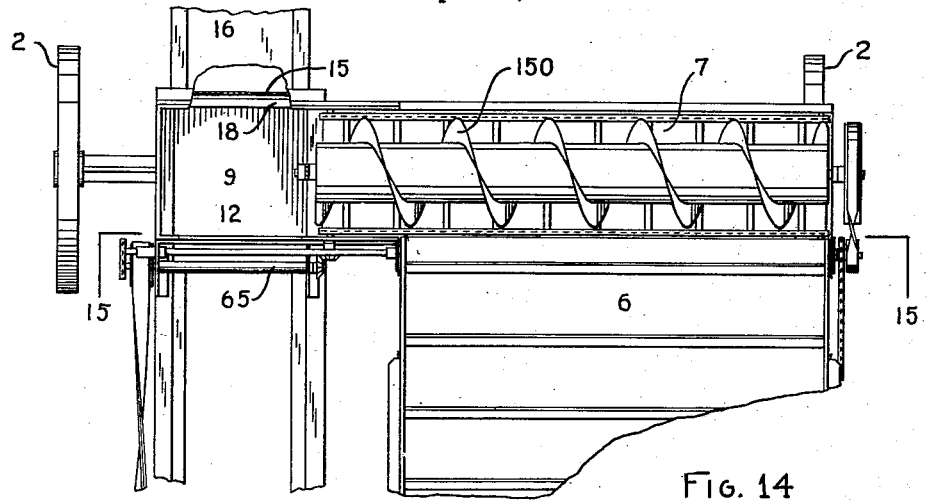
Fig. 14 is a fragmentary plan view of the device illustrated in Figs. 2, 3 and 11, showing a modified form of cylindrical conveyor, parts being omitted.
Figure 15:
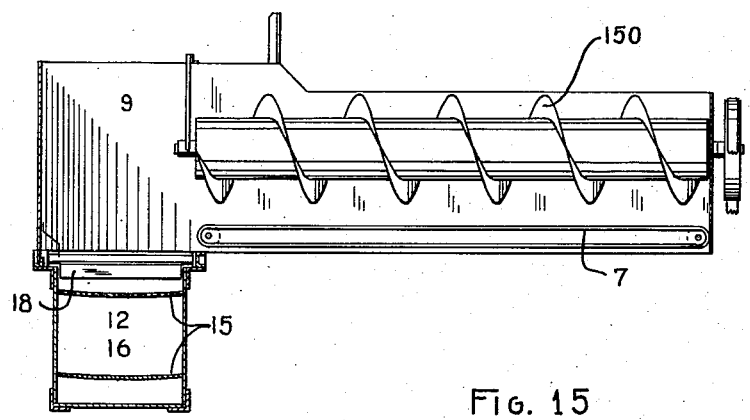
Fig. 15 is a fragmentary sectional view on line 15—15 of Fig. 14, parts being omitted.

As illustrated, the material received by conveyor 7 from conveyor 6 is advanced toward the feed chamber 9 by the traveling conveyor 7 itself, which, in some instances, may be sufficient. However, in other instances, in order to insure that the loose hay, straw, etc. may be advanced to the feed chamber 9 with greater facility, a cylinder 10 is supported in spaced relation above conveyor 7. This cylinder preferably has a smooth surface, although it may have a helical land to convert it into a screw conveyor 150, as seen in Figs. 14 and 15. As illustrated, this cylinder 10 serves more or less in the nature of a rotating covering or packing member functioning to keep the hay or other material in proper bounds and to press the material down onto conveyor 7, thus facilitating its advance.

If, desired, and as illustrated in the embodiment being described, a rotating feed rack or beater 11 may be provided above the discharge end of the conveyor 7. This rack rotates in a clockwise direction in Fig. 1 and serves to pitch the hay well into the feed chamber 9. The rack 11 rotates faster than the conveyor 7.

It may be stated at this point that the hay, straw or other material is all matted and interwoven due to the fact that it lays in the field in this manner, especially after a side delivery rake has gathered the hay into windrows. However, the present improvements may be used directly on the field, thus eliminating the time, labor and expense of using a side delivery rake.

However, as afore-mentioned, the material is fed into chamber 9 in a matted interlaced and interwoven condition and, as hereinafter described, this material is folded or lapped upon itself by the baler in the manner diagrammatically illustrated in Fig. 4.

As the material is fed into chamber 9, it may drop beneath into compression chamber 12, but the pronged feed arm 13 descends upon it in chamber 9 and pushes it into chamber 12 for the purpose, inter alia, of assisting in lapping the material. As hereinafter described, the feed arm 13 ascends and a plunger 14 advances through the compression chamber, compressing and pushing the matted material and lapping it against the cross wires or twine 15 at the fore-end of the baling chamber 16 which communicates with chamber 12. Each advance stroke of plunger 14 forces additional matted and lapped material into the baling chamber 16, whence it is temporarily held by dogs 17. A spring operated folder in the form of a swingable plate 18 is provided to assist in folding and cutting the material. (See Figs. 4, 6, 14 and 15.) The folder 18 is conventional, has been used on balers for years, and is well known in the art.

In the present improvements, provision is made for suspending the accumulation of material in the baling chamber 16, and this result is accomplished in the embodiment illustrated in Figs. 1 to 3 by automatically operated mechanism for holding the plunger in its advanced position. Thereupon, binding or tying the bale and shearing the matted fibers transpires, and then the temporarily arrested plunger is restored to its normal reciprocating function.

To accomplish the foregoing, one form of plunger 14 is illustrated in Figs. 5 and 5a; one form of shearing mechanism is illustrated in Fig. 6; and one form of control means is illustrated in Figs. 7 and 8; while the binding or tying mechanism, which is of conventional design, is shown in operative relation but not in detail, it being well known to those skilled in the art how such tying mechanism functions.

During the normal operation of the device—that is, while the plunger 14 is accumulating the matted material in the baling chamber and thus paying out the spaced wires or cords 15 with which the bale will ultimately be bound or tied (see Fig. 4) the tying mechanism 33 is inactive and in the position shown in Fig. 2. A clutch mechanism 19, for incepting the operation of the tying mechanism, is also normally inactive.

Upon reference to Figs. 7 and 8, the control mechanism for arresting and releasing the plunger and starting and stopping the tying mechanism and shearing mechanism is illustrated. This mechanism includes the conventional metering wheel 20 which, as is well known in the art, is an idler and is gradually rotated by the gradually accumulated material in the baling chamber. The shaft to which the metering wheel 20 is keyed or otherwise fixed carries at one end a trip member 21 keyed thereto. When the desired length of bale is reached, the metering wheel 20 has turned so that the trip 21 engages the rod 22 which carries pivotally mounted latch 23. This latch normally rests by gravity or, if desired, spring tension, in the position shown in Fig. 3. Further rotation of meter wheel 20 pulls rod 22 and latch 23 to the left in Fig. 7, and said latch, which normally engages slidable arm 24, pulls member 25 (to the left in Fig. 7) and bell crank member 26 about fixed pivot pin 27 so that the center line of spring 28, which is fastened to bell crank 26 and lever 29, passes to the opposite side of the pin 27 to the position shown in Fig. 8. Lever 29 is loosely pivoted at 27, at one end, and is slotted at its other end to accommodate a stud projecting from plunger latch 30. This shift in the spring tension tends to swing lever 29 inwardly toward the baling frame, and through the slot and stud arrangement, latch 30 is likewise urged toward the baling frame.

The tension of spring 28 is, therefore, urging the latch 30 inwardly through the frame 1 where latch 30 encounters the moving plunger 14. Said latch 30, is, therefore, temporarily held under tension against the side of the plunger and, when the latter advances to the extreme forward end of its compression stroke, its rear edge passes beyond the latch 30 and the latter, under the tension of spring 28, snaps into and behind the plunger 14. When the plunger begins to retract, it engages the latch 30 and is held against further retraction. The mechanism for driving the plunger, however, continues to operate as hereinafter described. As clearly seen in Figs. 7 and 8, suitable means are provided for limiting the lateral movements of members 26 and 30.

A clutch control lever 31, which normally maintains clutch 19 out of engagement or otherwise inactive, is operatively connected to and responsive to the movements of members 29 and 30. In the normal position of the said members, clutch control lever 31 is holding clutch 19 inactive. However, when the said members function to arrest plunger 14, as heretofore described, clutch control lever 31 is moved away from clutch 19, so that it responds to rotation imparted by gear 32, thereby incepting the operation of tying mechanism 33 and its related elements. Shaft 34 of the tying mechanism revolves in a counter-clockwise direction in Fig. 2 and, through members 35 and 36, swings arms 37, pivoted at 37a, in a clockwise direction in Fig. 2, whereby needles 38 and shearing mechanism 39 are advanced across the end of the completed bale for binding or tying, and for shearing same. Further rotation of shaft 34 causes needles 38 and shearing mechanism 39 to be returned to the position shown in Fig. 2. As is well known in the art, the needles carry the ends of wires or cords 15 (which are already positioned around three sides of the bale) across the inner face of the bale, whence the tying is completed and the wires or cords cut. Upon retraction, a new set of wires or cords 15 is positioned across the inner end of the baling chamber in readiness for the next bale to be accumulated and tied as seen in Figs. 14 and 15.

As previously stated, the wires or cords 15, the needles 38, the tying mechanism 33 and their manner of operation and relation to the organization are well known to those skilled in the art, have been in common use on balers for many years, and are frequently illustrated in the art, as, for example, in Innes 2,030,031, Feb. 4, 1936. It is, therefore, unnecessary to further describe or illustrate this mechanism.

As illustrated in Figs. 5 and 5a, the forward face of plunger 14 is provided with transverse slots 40 so that when the plunger is held in the compression chamber by latch 30, with the forward face of the plunger holding the accumulated hay, straw, etc. at the inner end of the baling chamber, the needles may freely pass around the inner end of the bale, through the slots 40, without interference. It is thus seen that the face of the plunger, in functioning as above described, dispenses with the necessity of inserting a board, as in prior constructions, for holding the accumulated material while it is being tied.

The shearing mechanism 39, hereinafter more particularly described, advances across the upper forward corner of plunger 14 (see Figs. 4 and 6) and shears and severs the matted and intertwined material at the upper-most fold of the last lap of the bale to be tied. This insures that the bale being tied and the new bale to be formed will not be fastened together by any matted or intertwined fibers.

As shaft 34 of the tying mechanism revolves, a plate 41 and a cam 42 revolve with it and the plate 41 encounters the up-standing portion of latch 23, rocking it about its pivot, whereby it is disengaged from slidable arm 24. As illustrated the plate 41 is of sufficient width so that it holds latch 23 in elevated and disengaged position until cam 42 functions. When cam 42 reaches the position illustrated in Fig. 8, it encounters stud 43 on the forked shift arm 44. Continued rotation of shaft 34 and cam 42, thereupon, causes shift arm 44, which is attached, as illustrated, to member 25, to push slidable arm 24 and member 25 to the right in Fig. 8. This is permissible due to the fact that plate 41 is holding latch 23 in disengaged position. This movement of member 25 to the right in Fig. 8 causes members 26 to 30 to function in a manner which is the reverse of that previously described, for withdrawing latch 30 from behind plunger 14 so that the parts are restored to the position shown in Fig. 7. Concurrently with this operation, the clutch control lever 31 is likewise restored to the position in Fig. 7 for again rendering clutch 19 inoperative, with the result that the tying mechanism 33 and the shearing mechanism 39 come to rest in the position shown in Fig. 2, whence they remain inactive until the meter wheel 20 again trips rod 22 and incepts the operations just described.

As above described, the movement of the latch 30 from the position in Fig. 8 to the position in Fig. 7 was attended by the disengagement of rod 22 and latch 23 from slidable arm 24. These parts are re-engaged after plate 41 passes out of engagement with the latch 23 by means of spring 45 attached to rod 22 and the baling frame. The said spring 45 retracts rod 22 and latch 23, whereby the latter passes over and again engages arm 24 after cam 21 on the meter wheel 20 has passed out of engagement with the rod 22 by reason of the fact that they are rotated by the material accumulating in the baling chamber for the formation of a new bale.

Referring now more particularly to the plunger construction illustrated in detail of Figs. 5 and 5a, it is understood and well known in the art that the feed arm 13 and plunger 14 are synchronized so as to alternately enter and leave the compression chamber 12. The plunger 14, as illustrated, consists of a rectangular box form having slots 40 for the purpose hereinbefore described. This plunger 14 is actuated by a connecting rod, which, in the illustrated embodiment, consists of telescoping members 46 and 47. The member 47 has a transverse bearing 48, which surrounds crank pin 49 eccentrically carried by gears 50, suitably driven by motor 3 or other power means. The telescopic connecting rod consists of the tubular member 46, one end of which is pivotally attached to plunger 14, and of a cylindrical member 47 of less diameter which has its inner end disposed within the tubular member 46. Members 46 and 47 are releasably or yieldingly held in rigid relation by springs 51 on latch 52 mounted on tubular member 46 and releasably engaging a bearing 53, the latter mounted on collar 54 on member 47. The gears 50 and crank pin 49 thereby actuate the plunger through the normally connected rod, as is well understood and as shown in Fig. 1.

At the time when the plunger reaches the forward limit of its compression stroke and at the time when latch 30 is in the position shown in Fig. 8, to wit, slightly spaced from the rear face of plunger 14, the initial rearward movement of the plunger 14 by crank pin 49 results in the plunger encountering latch 30, which arrests it and the continued power of gears 50 and crank pin 49 cause the member 47 to be pulled relative to tubular member 46, with the result that spring actuated latch 52 is released so that the gears 50 can continue revolving for one revolution, while the plunger is held and the tying and shearing operations are performed (see Fig. 5). When the crank pin completes the revolution, the member 47 is advanced within tubular member 46 and spring actuated latch 52 again unites and holds members 47 and 46 as a unit. In this operation, the members are so arranged that a slight advance movement is given to plunger 14, thereby spacing it slightly from the latch 30 so that the latter can readily be retracted under the influence of spring 28. This arrangement insures against any frictional engagement between plunger 14 and latch 30, preventing the withdrawal of the latch 30. As seen in Fig. 8, the coacting faces of latch 30 and plunger 14 are beveled or inclined to facilitate engagement and disengagement.

It is obvious that spring actuated latch 52 is adjustable so that the tension of the latch may be increased or decreased to function under varying conditions. While applicant has illustrated one embodiment of the plunger actuating mechanism, it is manifest that other forms may be employed without departing from the principle of this part of the improvements. The member 46 of the plunger operating rod carries a connection 55 for operating feed arm 13, as is well understood.

Upon reference to Figs. 1 and 6, the shearing mechanism and its actuating parts will be readily understood. This mechanism consists of a traveler 56 carrying a knife 57 and a positively rotated toothed member or saw 58. The knife and saw are mounted in closely adjacent vertical planes (see Fig. 4) and their cutting edges are so positioned as to provide a V-shaped opening into which the matted fibers to be sheared are disposed as the traveler 56 advances the knife and saw across the upper corner of the bale to be severed. The knife is under the matted fibers and the rotating saw cuts into the body of the fibers, thereby cleanly severing them. Mechanism for actuating this shearing device consists of a link 59 attached to an arm 37 of the tying mechanism 33 for operating in synchronism therewith. An elbow-shaped member, consisting of arms 60 and 61, has one end loosely mounted on the shaft of saw 58 and the other end loosely mounted on shaft 62. Accordingly, when the link 59 advances traveler 56, the elbow-shaped member is also advanced (to the right in Fig. 6) about its loose pivots and, obviously, retracts in a similar manner. The circular saw 58 is constantly rotated by power transmission received from shaft 62 through suitable gears and chains 63, as illustrated. Shaft 62 is driven from motor 3, as illustrated in Fig. 1.

As noted upon reference to Fig. 1, all of the elements described are suitably actuated through power transmission means, preferably derived from motor 3, and the entire organization is synchronized so that the parts are rotated and propelled in timed relation to automatically accomplish the purposes of the improvements.

In the form of the invention illustrated in Figs. 1 to 3, a clutch 64 is normally in engagement about shaft 65, which transmits power to the conveyor 7 and beater 11. Provision is made to temporarily render this clutch inoperative and thereupon to restore it to operation by means of arm 66 attached to and operated by latch 30. Accordingly, when latch 30 is moved to a position for arresting movement of the plunger 14, arm 66 renders clutch 64 inoperative, thereby temporarily arresting the conveyor belt 7 so that the feeding of material into feed chamber 9 is arrested. As latch 30 is withdrawn to the position in Fig. 7, arm 66 again functions to render clutch 64 operative for restoring motion to conveyor 7 and beater 11.

A continuous feed baling machine of the same character as illustrated and described in Figs. 1 to 3 is also contemplated by the present improvements, and the only modification necessary is to dispense with clutch 64 and arm 66. Such an arrangement is illustrated in the fragmentary view of Fig. 11. In that view, the shaft 65 is directly connected for operation by motor 3 without the interposition of a clutch. Otherwise, the modified form shown in Fig. 11 has elements and functions identical with those described and illustrated in Figs. 1 to 3. This continuous feed machine is also shown in Figs. 14 and 15, wherein the shaft 65, driven by motor 3, is directly connected for driving conveyor 7, as previously shown in the fragmentary Fig. 11, however, further illustration of this continuous feed baling machine is omitted to avoid undue duplication in the drawings. A continuous feed machine may also be provided by merely disconnecting arm 66 in the embodiment of Figs. 1 to 3.

In the type of mechanism to which the present improvements are directed, it may be preferable to dispense with the needles entirely and dispense with the knotting portion of the tying mechanism, and permit the tying to be done by hand. In dispensing with said elements, the farmer himself may remove them or they may be dispensed with at the time of manufacture. The shearing means should also be disconnected at 59 only. The devices, otherwise, would operate as heretofore described. The only change which is suggested in accomplishing manual tying of the wires or cords is one of convenience. In order to make it more convenient and in order to insure that the wires of one bale do not become entwined with the wires of the next bale, a transverse partition member for slots 48 in plunger 14 is provided. Therefore, when the plunger is held in its forward position against the end of the bale, the men on each side of the baling chamber who thread the wires through the slots will be certain to place the wires in the proper spaced slots formed by the transverse partitions in a manner so that the wires of each bale cannot possibly become over-lapped. This precaution is, as heretofore stated, to prevent the bales being tied together inadvertently.

The present improvements are also adapted for use with a combine to which it may be attached, so that the straw and chaff may be discharged directly from the combine onto the conveyor belt 7. In such uses of the improvements, the pick-up mechanism may be dispensed with.

Figs. 9 and 10 illustrate details of the gears 50. A portion 67 of the circumference of these gears is wider and heavier in transverse dimension than the remainder of the gears. This enlarged portion of the gears is heavier and is weighted to give more power to the advance stroke of the plunger. Moreover, the use of the wider sector of the gear provides stronger teeth during the power portion of the stroke. During the remainder of the revolution of the gears, strength and power are not so essential and the gears, therefore, are reduced in their transverse dimensions. An outstanding advantage of this construction is that the entire baling unit may be 150 pounds or more lighter in construction, and the cost of the gears is enormously reduced.

The modified form of the device shown in Figs. 12 and 13 of the drawings is one which is, by way of illustration, also a vehicle but which is provided with a single means for collecting from the ground the material to be baled. This modified form also includes means for suspending the accumulation of material in the baling chamber by temporarily arresting the feed mechanism, but without arresting the plunger. It consists of a frame 100 mounted on wheels 102. The frame may carry any suitable means for attaching it to a tractor or other motive device. The frame may also carry a motor 104 to provide power for operating the mechanism. Obviously, however, the power may be obtained from some other source such as a suitable power take-off from a tractor. The frame also carries a pick-up conveyor 106, carrying conveyor slats 107, actuated by chains 108, which derive their motive power from the baler or the motor thereof. Cooperating with the pick-up 106 is a second conveyor 105 which delivers the material to the feed chamber 113 and, thence, to compressing chamber 115 of the baler, whereupon it is passed on and accumulated in baling chamber 114 by plunger 116. The conveyor 105 is preferably a plane belt conveyor provided with slats 110, the conveyor being moved by means of chains 109. The discharge of the material from the conveyor into the feed opening is facilitated by the beater wheel 112. Conveyors 105 and 106 are driven, as illustrated, from the motor 104 or other power source. A clutch construction 103 is provided for temporarily arresting the feed movement of beater wheel 112 and conveyor 105, as hereinafter set forth.

The plunger 116 and the feed arm (not shown) are driven in much the same manner as in the preferred forms, except that connecting rod 118, as a unit, is pivotally mounted at each end respectively to the plunger 116 and to sprocket wheels 119, driven by the motor 104.

Shaft 121 drives the slip clutches 122 and 124. Clutch 122 controls the tying mechanism 134 and clutch 124 controls the clutch 103. In clutch 124, the plate at the hub is constantly rotating. The other plate of this clutch is held against rotation by spring held arm 125 engaged in a notch in the periphery of the plate of clutch 124, thereby arresting its rotation. The spring, holding arm 125 to the right, is shown in Figures 12 and 13. In clutch 122, the plate at the hub is constantly rotating. The other plate of this clutch is held against rotation by arm 123. Arms 123 and 125 are withdrawn under the influence of the metering wheel 126, thereby allowing the two plates of clutch 124 to rotate in unison and the two plates of clutch 122 to rotate in unison. As in the embodiment previously described, the metering wheel pulls rod 127, spring actuated hook 128, and rod 125 to the left in Figs. 12 and 13, thereby withdrawing arm 125 from the notch and permitting clutch 124 to become operative. As this clutch revolves, a stud on the previously non-rotating plate of the clutch engages rod 129 (to which shaft 130 is also connected) for movement as hereinafter described. Rod 129 is thereby advanced toward clutch 103, where it engages a stud on one plate thereof, thereby arresting it and temporarily stopping further movement of belt conveyor 105. The material to be baled is no longer fed to chambers 113 and 115, with the result that the accumulation of material in the baling chamber 114 is suspended. In this translating movement of rod 129, the shaft 130 is turned upon its longitudinal axis, thereby moving the integral arm 131 into the path of travel of the pitman 132. Rod 129 and shaft 130 are frictionally held in the position just described.

When clutch 124 has completed a partial revolution, a lug thereon actuates shaft 133, operatively connected to arm 123, whereby the latter is withdrawn from the non-rotating plate of clutch 122. Both plates of clutch 122 thereby rotate in unison and the tying mechanism 134 is actuated. The shaft 133 and arm 123, under spring tension, return to their original position to arrest clutch 122 after one revolution.

It is thus seen at this stage that the feed conveyor 105 is arrested, and the tying mechanism 134 begins to function. However, the plunger 116 continues to reciprocate in chamber 115, thereby accomplishing a few strokes cleansing said chamber of residual material. The forward face of plunger 116 is slotted in the same manner as plunger 14 in the embodiments previously described.

As the tying mechanism is functioning, the pitman 132 engages shaft extension 131, rotating shaft 130, thereby withdrawing rod 129 and allowing clutch 103 to again operate conveyor 105. Upon the further rotation of the pitman 132, it trips hook 128, allowing spring actuated arm 125 to return to position for engaging in the notch of the plate of the slip clutch 124. After one revolution of clutch 122, the tying function is completed and arm 123, in the path of travel of the plate of this clutch, arrests further rotation of the said plate, thereby stopping the tying mechanism until the next operation.

As a new bale is being accumulated, the metering wheel passes beyond and out of engagement with arm 127, whereupon a spring retracts said arm to a point where hook 128 snaps over the end of arm 125. Further description of this form is deemed unnecessary in view of the detailed description of other modifications which otherwise function similarly.

It is apparent, from the foregoing specification, that an efficient and light weight machine is produced, and one which operates at a minimum expenditure in man power, as well as expense in motive power, and which binds and discharges closely packed or solid bales at a greater rate than heretofore. A machine embodying the present improvements requires only half the time to gather and bale a given field of material, as that required by the use of prior constructions.

Various modifications as well as changes in details of construction will be apparent to those skilled in the art. Further description and illustration of same are omitted, but such modifications and changes are embraced within the scope and purview of the claims.

What I claim is—

1. In a baling machine, a compressing chamber, a baling chamber, a plunger reciprocable in said compressing chamber, a connecting rod for actuating said plunger, said connecting rod including members engaging one another in such manner as to permit free longitudinal sliding, spring means yieldably connecting said members, means for imparting a reciprocating motion to one of said members, and means for locking the plunger in its compressing position.

2. In a baling machine, a compressing chamber, a baling chamber, a plunger reciprocable in said compressing chamber, a connecting rod for actuating said plunger, said connecting rod including tubular members, one slidably mounted within the other, one of said members engaging the plunger, the other member engaging means for imparting a reciprocating motion, spring means releasably connecting said members, and means for locking the plunger in its compressing position.

3. In a baling machine, a chamber, a plunger reciprocable in said chamber, means for reciprocating said plunger, means responsive to the bale accumulated by said plunger for locking said plunger at the advance stroke thereof, and means operable by said reciprocating means for freeing said reciprocating means from said plunger.

4. In a baling machine, a chamber, a plunger reciprocable in said chamber, means for reciprocating said plunger and means responsive to the bale accumulated by said plunger for locking said plunger at the advance stroke thereof, means operable by said reciprocating means for freeing said reciprocating means from said plunger and means for subsequently releasing said plunger.

5. In a baling machine, a chamber, a plunger reciprocable in said chamber, releasable means for imparting a reciprocating motion to the plunger, means for tying the formed bale, means responsive to the accumulated size of the bale for locking the plunger at the end of its travel and actuating the tying means.

6. In a baling machine, a chamber, a plunger reciprocable in said chamber, means for imparting a reciprocating motion to the plunger, means for tying the bale, means responsive to the accumulated size of the bale for locking the plunger in its advanced position, means for actuating the tying means, and means for freeing the plunger.

7. In a baling machine, a feed chamber, means for continuously feeding material to be baled to the feed chamber, a compressing chamber communicating with said feed chamber, a plunger in said compressing chamber, means coacting with said plunger to force material from the feed chamber into the compressing chamber when the plunger is on its return stroke, releasable means for imparting a reciprocating motion to the plunger, means for tying the bale, means responsive to the accumulated size of the bale for locking the plunger in its compressing position and actuating the tying means, and means for freeing the plunger.

8. In a baling machine, a feed chamber, means for continuously feeding material to be baled to the feed chamber, a compressing chamber communicating with said feed chamber, a baling chamber communicating with said compressing chamber, a plunger in said compressing chamber so situated as to be free of the opening between the feed chamber and the compressing chamber on its return stroke and to close the opening on its compressing stroke, means coacting with said plunger to force material from the feed chamber into the compressing chamber when the plunger is on its return stroke, releasable means for imparting a reciprocating motion to the plunger for passing the material toward the baling chamber, means for tying the bale, automatic means responsive to the accumulated size of the bale for locking the plunger in its compressing position and actuating the tying means, and means for freeing the plunger.

9. In a baling machine, feed conveyor means including a rotary conveyor disposed longitudinally above a portion of a moving plane conveyor, a feed chamber, a compressing chamber below said feed chamber, a baling chamber communicating with said compressing chamber, a plunger in said compressing chamber, means coacting with said plunger to force material from the feed chamber into the compressing chamber when the plunger is on its return stroke, releasable means for imparting a reciprocating motion to the plunger for passing the material into the baling chamber, means for tying the bale, means for shearing the end of the bale, means responsive to the accumulated size of the bale for locking the plunger in its compressing position and actuating the tying and shearing means, and means for freeing the plunger when a complete operation of the tying means has occurred.

10. In a baling machine, a feed chamber, means for continuously feeding material to be baled to the feed chamber, a compressing chamber below said feed chamber, a plunger, a feed board, means for alternately reciprocating said plunger and board in said compressing chamber, and means responsive to the accumulated material for arresting said plunger when it is advanced within said chamber, for holding said material for binding.

11. In a baling machine, a metering wheel actuated by an accumulating bale, and means responsive to movement of said wheel for motivating a plunger-arresting latch, a tying mechanism and a bale shearing device.

12. In a baling machine, a compressing chamber, a baling chamber, a plunger operable in said compressing chamber, means for producing a reciprocating motion, a connecting rod including two members engaging one another in such manner as to permit relative longitudinal movement, one of said members engaging the plunger and the other member engaging said means for producing a reciprocating motion, means for holding said members in firm but yielding relationship, and means for locking said plunger in its compressing position.

13. In a baling machine, a compressing chamber, a baling chamber, a plunger operable in said compressing chamber, a crank for producing a reciprocating motion, two tubular members slidably mounted one within the other, one of said members being pivotally connected to said plunger, the other member being pivotally connected to said crank, a latch on one member engaging and holding the other member, means for locking said plunger in its advanced position, and means on one of said members for releasing said latch upon retraction of said crank connected member.

EDWIN B. NOLT.